(12) United States Patent
Liao (10) Patent No.: US 6,443,498 B1
(45) Date of Patent: Sep. 3, 2002

(54) JOINT ENGAGEMENT DEVICE FOR TWO MULTI-JOINT MECHANISMS

(75) Inventor: Ing-Fang Liao, Taichung (TW)

(73) Assignee: Aerospace Industrial Development Co., Ltd., Taichung (TW)

( * ) Notice: Subject to any disclaimer, the term of this patent is extended or adjusted under 35 U.S.C. 154(b) by 60 days.

(21) Appl. No.: 09/765,355

(22) Filed: Jan. 22, 2001

(51) Int. Cl.⁷ ............................................... F16L 39/00
(52) U.S. Cl. .................... 285/124.1; 285/320; 285/308; 285/124.2; 285/124.3
(58) Field of Search .................... 285/320, 124.1–124.5, 285/308–311

(56) References Cited

U.S. PATENT DOCUMENTS

| | | | |
|---|---|---|---|
| 4,494,775 A | * | 1/1985 | Nash et al. .................. 285/310 |
| 5,316,347 A | * | 5/1994 | Arosio ..................... 285/124.4 |
| 5,344,194 A | * | 9/1994 | Hatagishi et al. ........... 285/320 |
| 5,507,530 A | * | 4/1996 | Mahaney .................. 285/124.1 |

FOREIGN PATENT DOCUMENTS

DE          3731943 A1  *  6/1989

* cited by examiner

Primary Examiner—Lynne H. Browne
Assistant Examiner—Aaron M Dunwoody
(74) Attorney, Agent, or Firm—Rosenberg, Klein & Lee (57) ABSTRACT

A joint engagement device includes a base board having a plurality of first joints defined therein and two sidewalls extend from the base board. A connection board is connected between the two sidewalls and two slots are defined through the connection board so that two posts of a carrier member movbaly extend therein. An operation frame has two arms each of which is connected between the sidewall and the post. An engaging board has a plurality of second joints and is engaged with between the two posts of the carrier member. The carrier member carries the engaging board to move toward the base board to engage the second joints with the first joints when pivoting the operation frame toward the base board.

5 Claims, 11 Drawing Sheets

JOINT ENGAGEMENT DEVICE FOR TWO MULTI-JOINT MECHANISMS

FIELD OF THE INVENTION

The present invention relates to a joint engagement device for two multi-joint mechanisms, especially for quick connection of joints on an air pad and a pump device.

BACKGROUND OF THE INVENTION

A conventional large air pad includes a plurality of pumping circuits and bladders, and in order to inflate the air pad within a short period of time, many joints are installed on the pad. A pump device for inflating the air pad includes multiple joints each of which has a hose connected to a compressor, and the joints on the pump device are connected to the joints on the air pad and introduce air into the pad so as to inflate the air pad. Conventionally, each of the joints on the air pad and the pump device are connected with each other one by one so that much labor hours are required. Sometimes, the sequence of the joints are strictly demanded so that how to efficiently and correctly connect the joints is an important issue. Similarly, the disengagement of the joints on the pump device and on the air pad is done manually and this takes a lot of time if the number of engagement or disengagement is increased.

The present invention intends to provide a joint engagement device which is able to engage multiple joints by one action.

SUMMARY OF THE INVENTION

In accordance with one aspect of the present invention, there is provided a joint engagement device and comprising a base board having a plurality of first joints defined therein and two sidewalls extending from the base board. A connection board is connected between the two sidewalls and two slots are defined through the connection board. A carrier member has a transverse bar and two posts which movably extend through the two slots. Each of the two posts has two notches defined in a surface thereof and each of the two posts has a groove defined longitudinally in an inside thereof. The notches communicate with the groove in each of the posts.

An operation frame has a handle and two arms extending from two ends of the handle. The two arms are respectively and pivotally connected to two respective insides of the two sidewalls by two first bolts, and the two arms are respectively to connected to the two posts by two second bolts. An engaging board has a plurality of second joints and two protrusions extend from each one of two sides of the engaging board.

The protrusions are inserted into the notches and slidably received in the grooves. The operation frame is moved toward the base board to engage the second joints with the first joints when pivoting the operation frame toward the base board.

The primary object of the present invention is to provide a carrier member movably connected between a base board with first joints and an engaging board with second joints, the engaging board carries the engaging board toward the base board by operating an operation frame which is pivotally connected between the base board and the carrier member.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
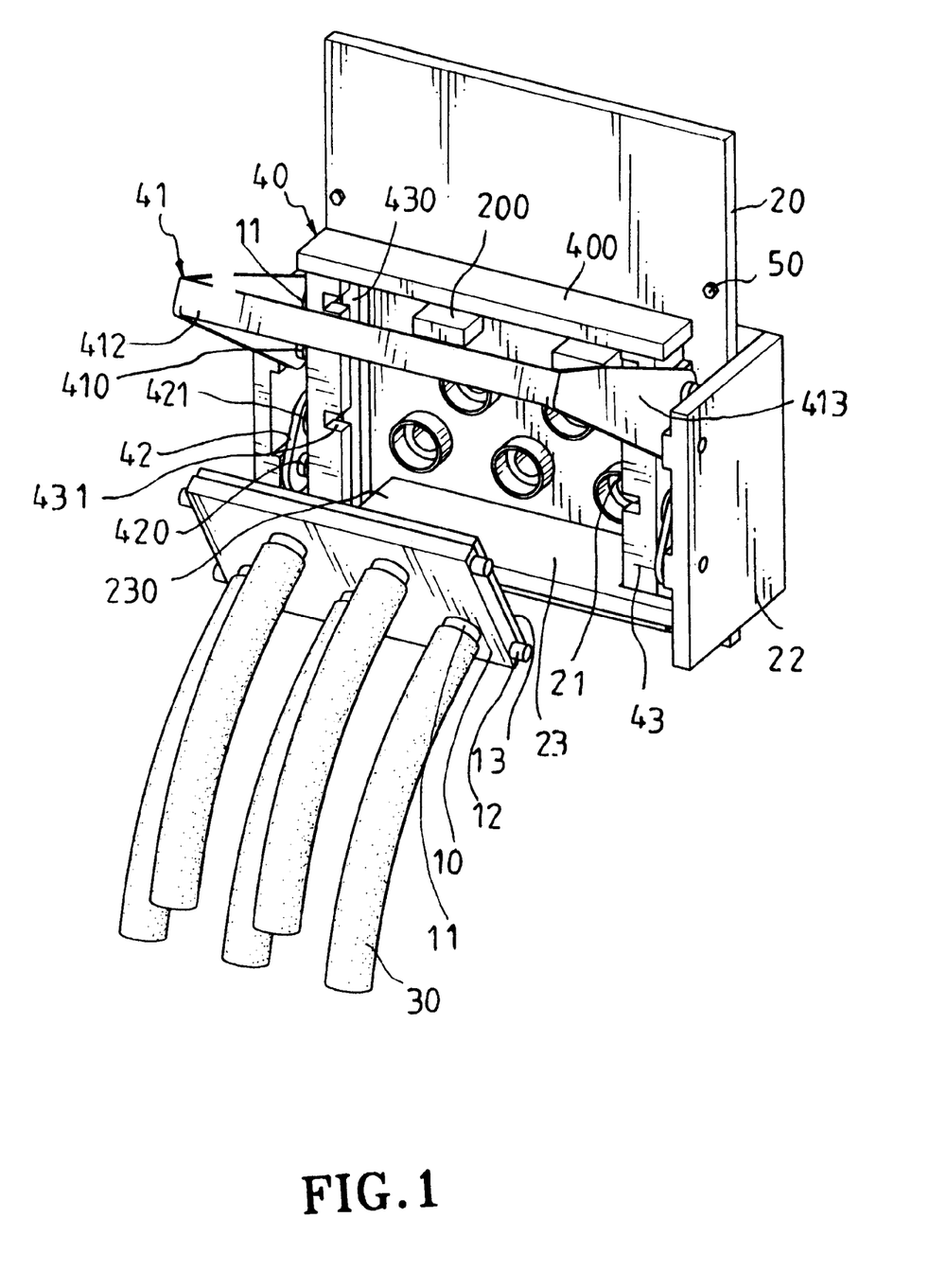
FIG. 1 is an exploded view to show a base board with a carrier member and an operation frame, and an engaging board of a joint engagement device of the present invention.
Figure 2:
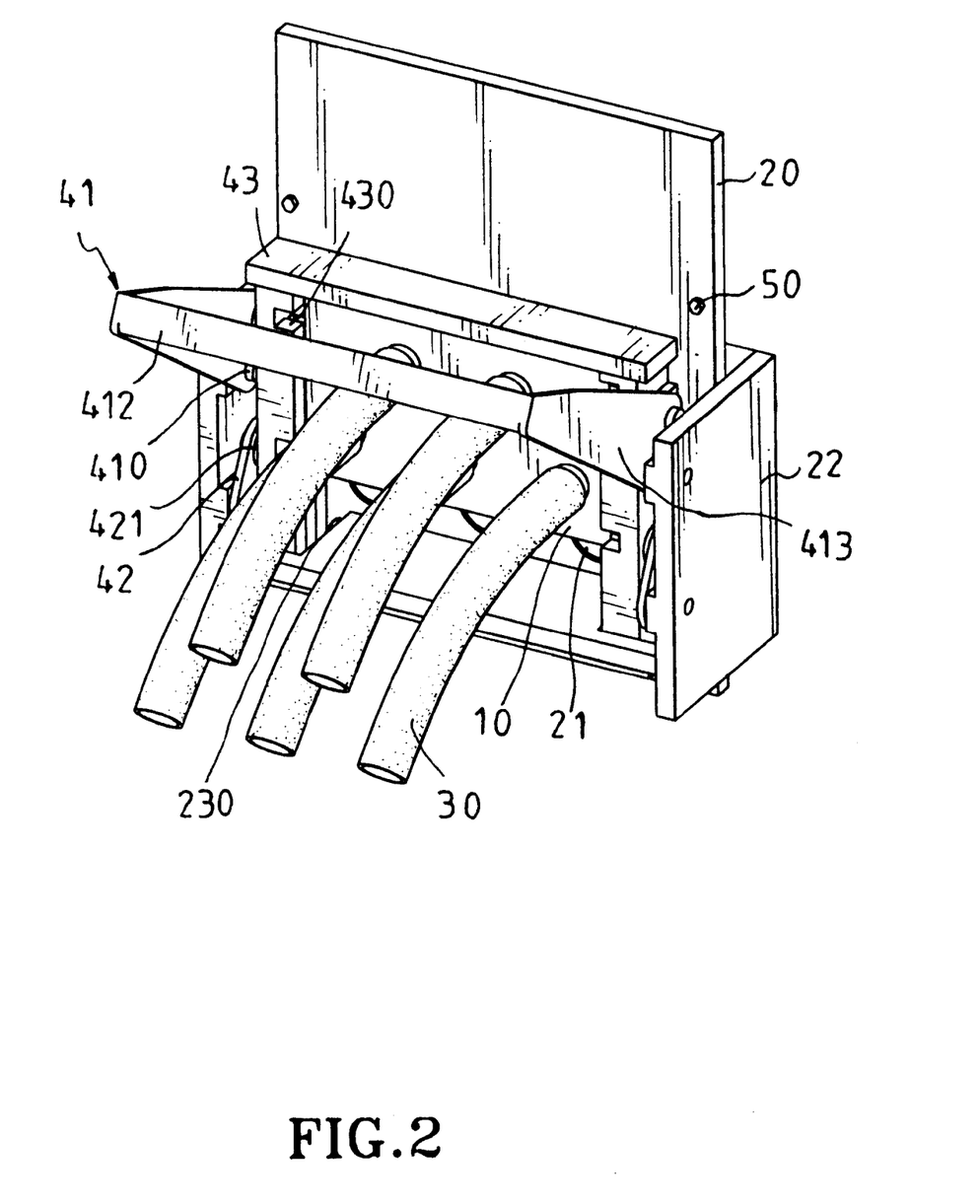
FIG. 2 is a perspective view to show the engaging board is initially connected to the carrier member of the joint engagement device of the present invention.
Figure 3:
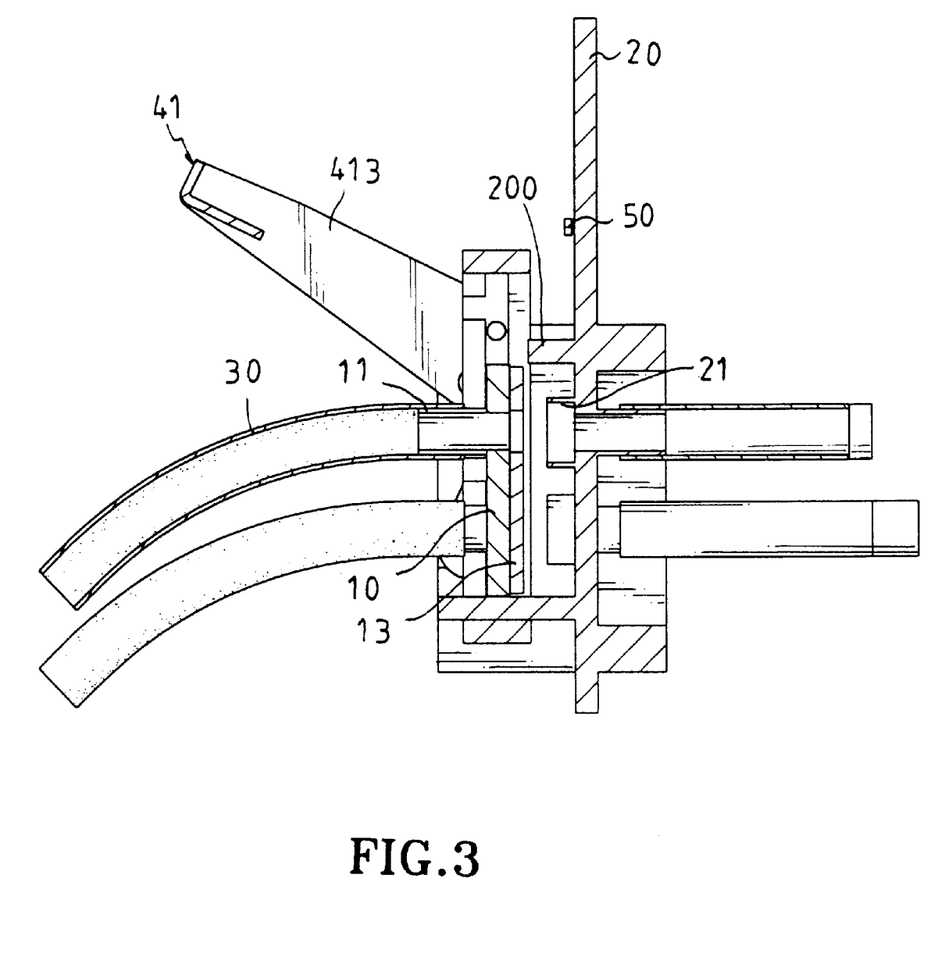
FIG. 3 is a side cross sectional view to show the engagement as illustrated in FIG. 2.
Figure 4:
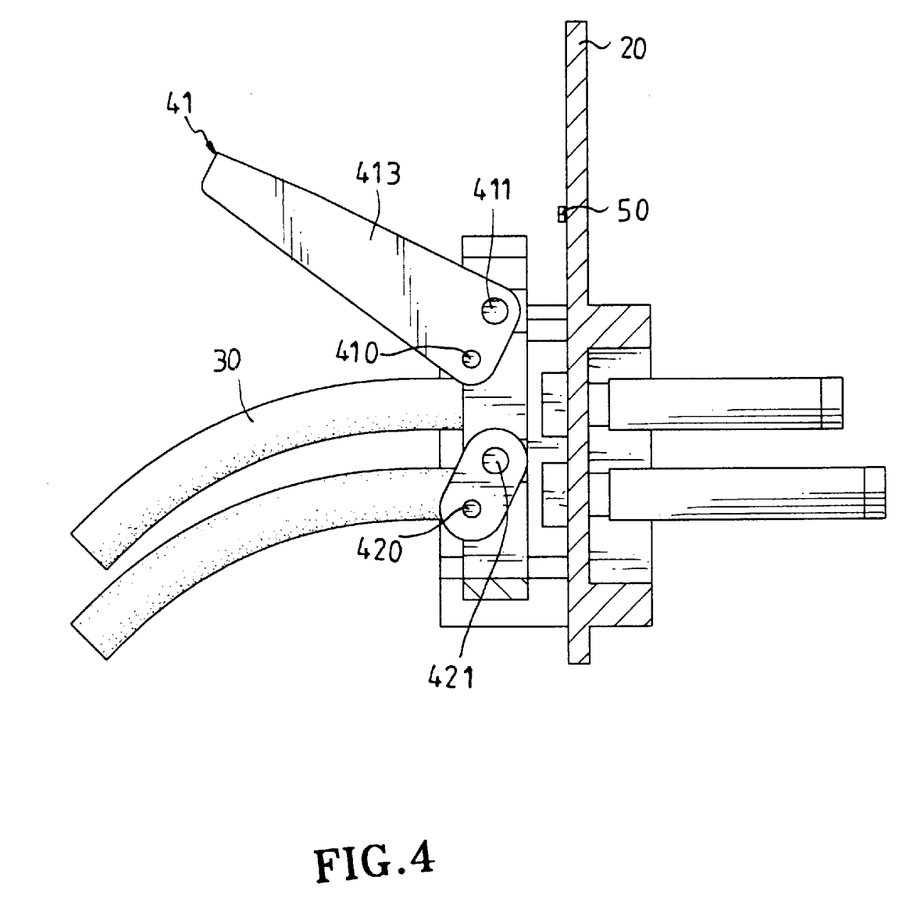
FIG. 4 is a side cross sectional view to show the pivotal points of the operation frame and the link at the situation as illustrated in FIG. 2.

Referring to FIGS. 1 to 4, the joint engagement device of the present invention comprises a base board 20 having a plurality of first joints 21 defined therein and each of the first joints 21 is connected to a hose from an air pad, for example, as shown in FIG. 3. Two sidewalls 22 extend from the base board 20 and a connection board 23 is connected between the two sidewalls 22. Two slots 230 are defined through the connection board 23 for two posts 43 of a carrier member 40 movably extending therethrough. Two pads 50 are located on the base board 20.

The carrier member 40 has a transverse bar 400 and the two posts 43 extend from two ends of the transverse bar 400. Each of the two posts 43 has two notches 431 defined in a front surface thereof and each of the two posts 43 has a groove 430 defined longitudinally in an inside thereof. The notches 431 communicate with the groove 430 in each of the posts 43. Two limits 200 extend from the base board 20 and are located above the first joints 21.

Figure 8:
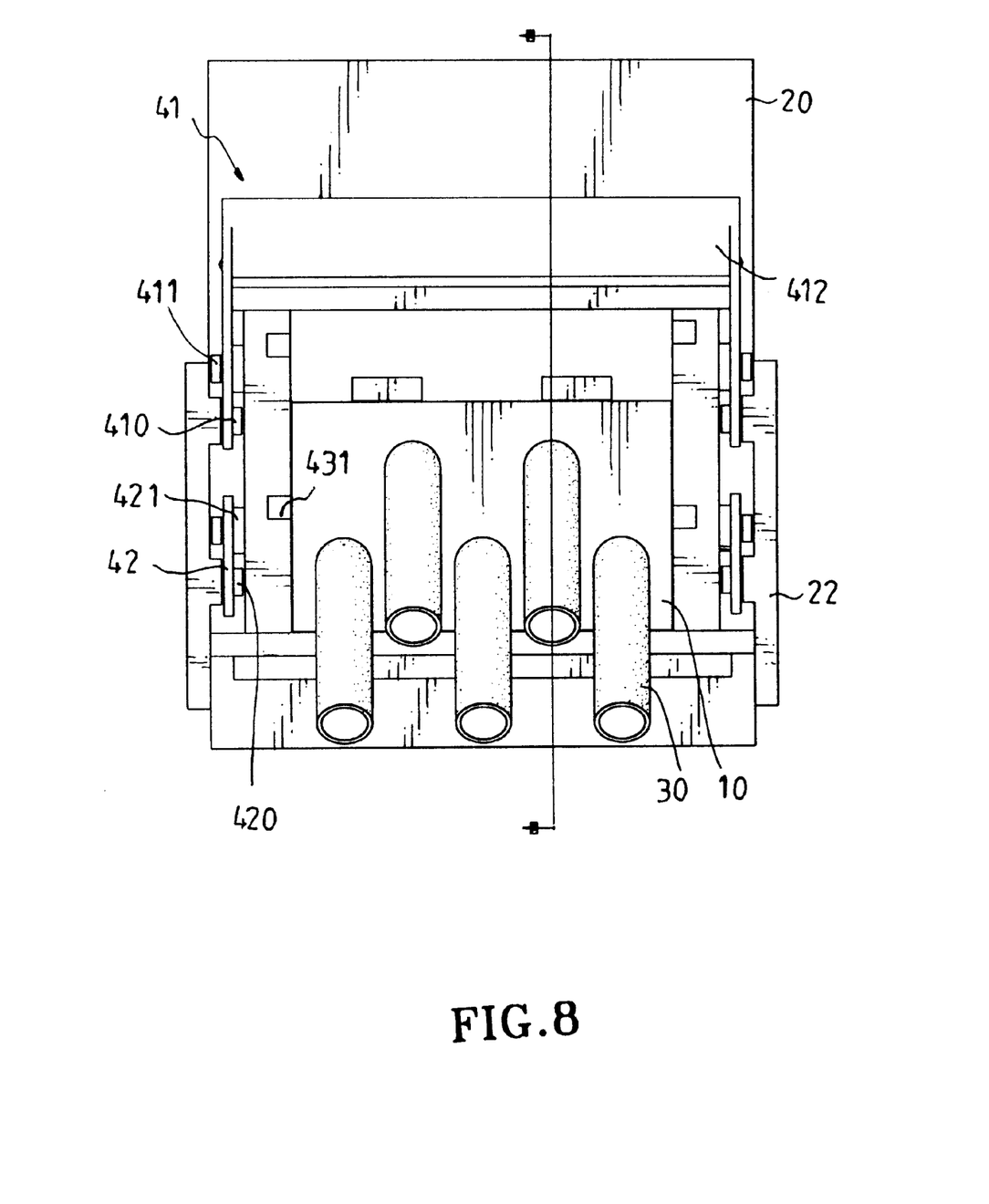
FIG. 8 is view to show how the arms of the operation frame are connected to the sidewalls and the posts of the carrier member.
Figure 9:
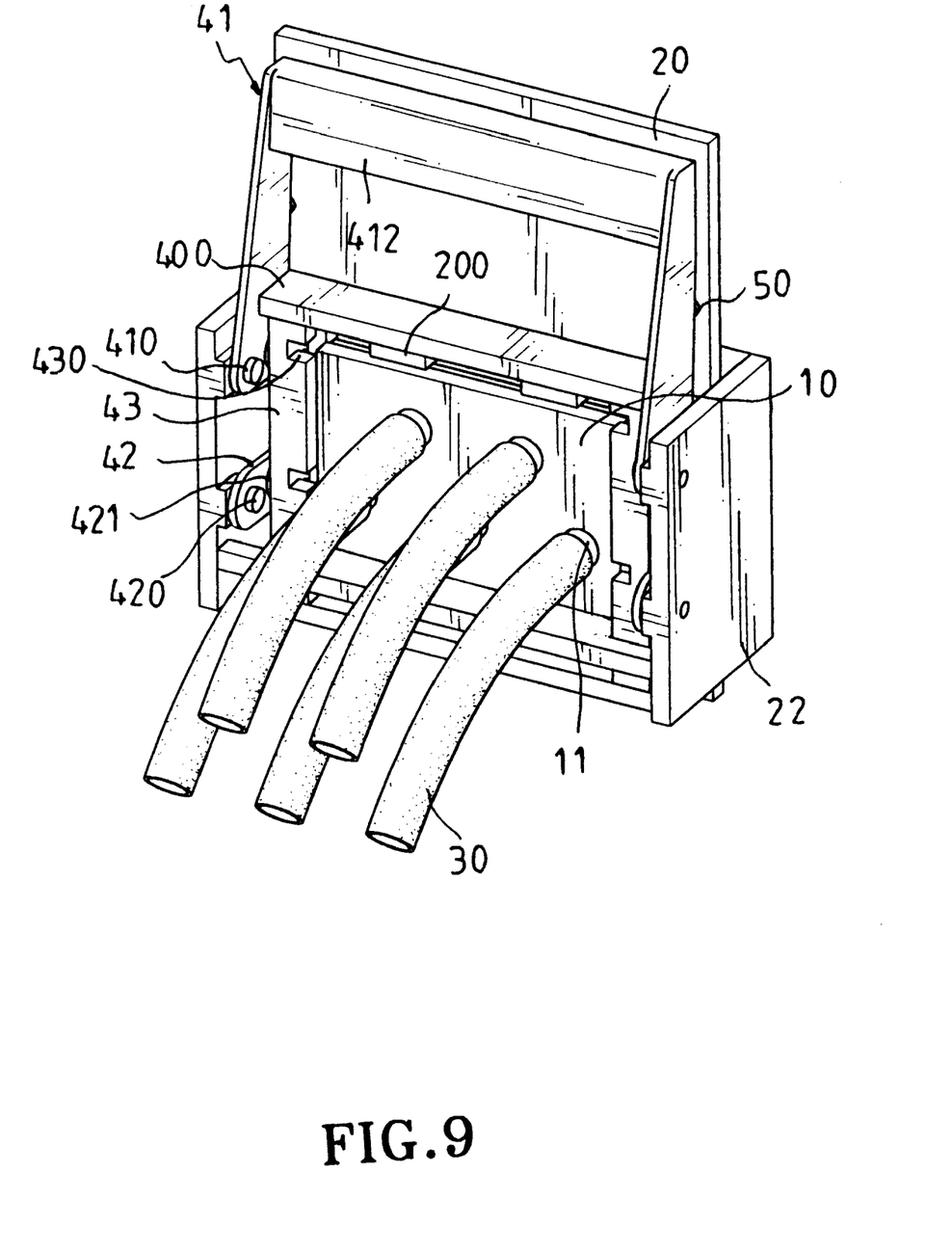
FIG. 9 is a perspective view to show the engaging board is matched with the base board by pivoting the operation frame.

An operation frame 41 has a handle 412 and two arms 413 extending from two ends of the handle 412. The two arms 413 are respectively and pivotally connected to two respective insides of the two sidewalls 22 by two first bolts 410 as shown in FIG. 8. The two arms 413 are also respectively connected to the two posts 43 by two second bolts 411. The first bolts 410 are located lower than the second bolts 411 when the operation frame 41 is not pivoted toward the base board 20. Two links 42 are respectively connected between the two posts 43 and the two insides of the two sidewalls 22. A first end of each of the links 42 is pivotally connected to the inside of the sidewall 22 by a third bolt 420 and a second end of each of the links 42 is connected to the post 43 by a fourth bolt 421.

Figure 5:
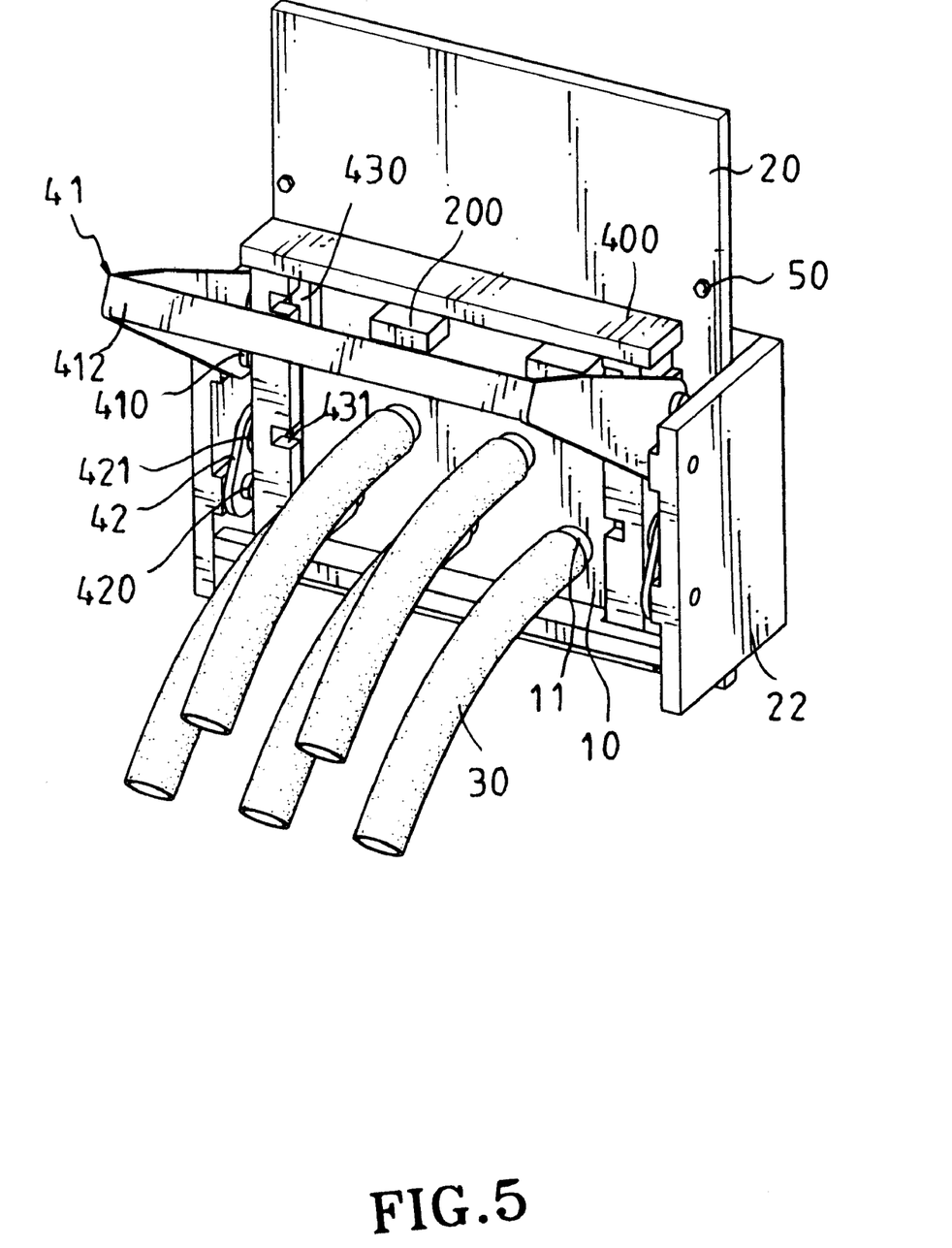
FIG. 5 is a perspective view to show the engaging board is connected to the carrier member of the joint engagement device of the present invention.
Figure 6:
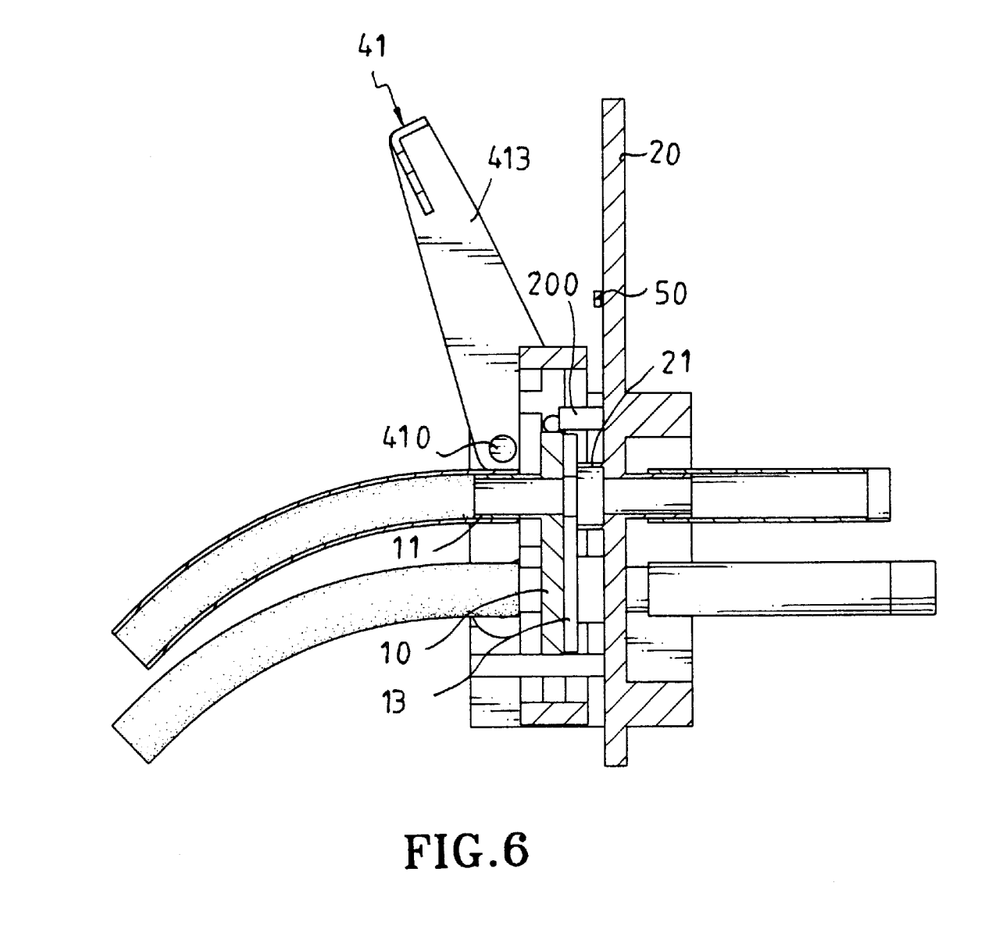
FIG. 6 is a side cross sectional view to show the engagement as illustrated in FIG. 5 wherein the operation frame is to be pivoted toward the base board.
Figure 7:
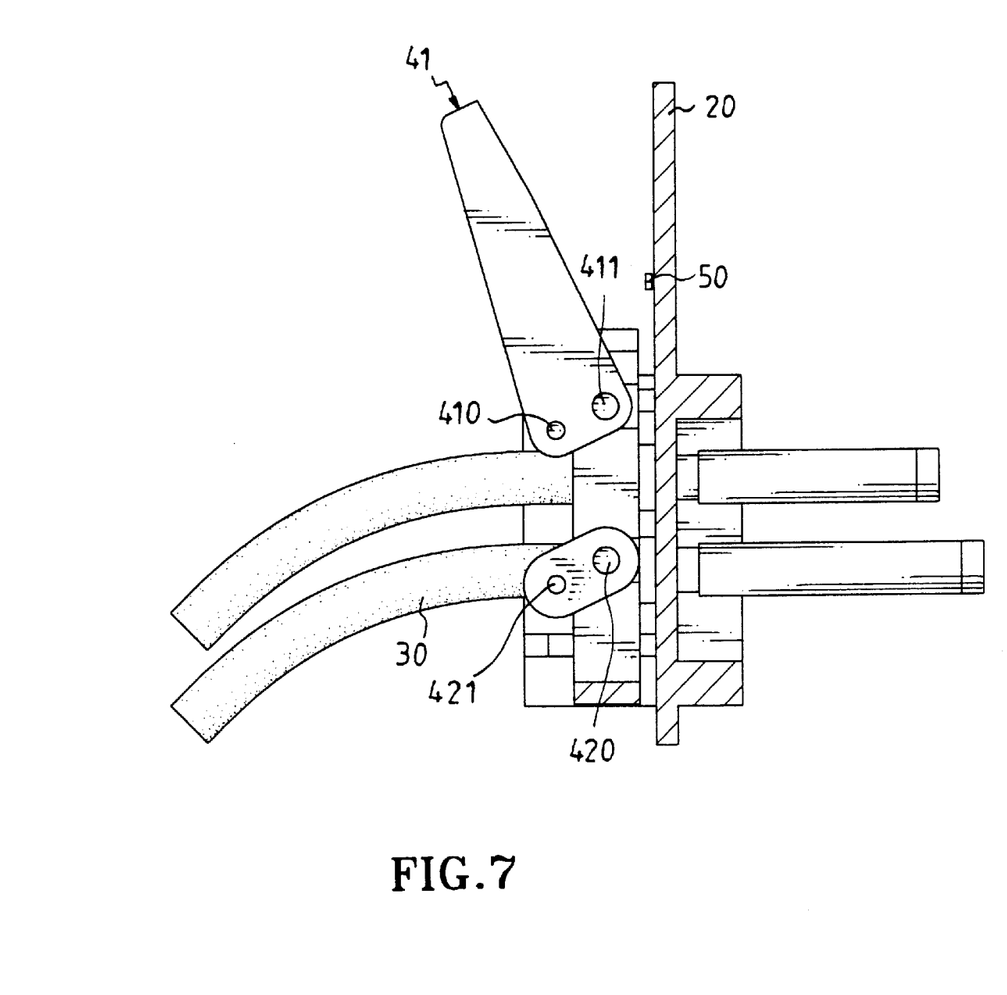
FIG. 7 is a side cross sectional view to show the pivotal points of the operation frame and the link at the situation as illustrated in FIG. 6.
Figure 10:
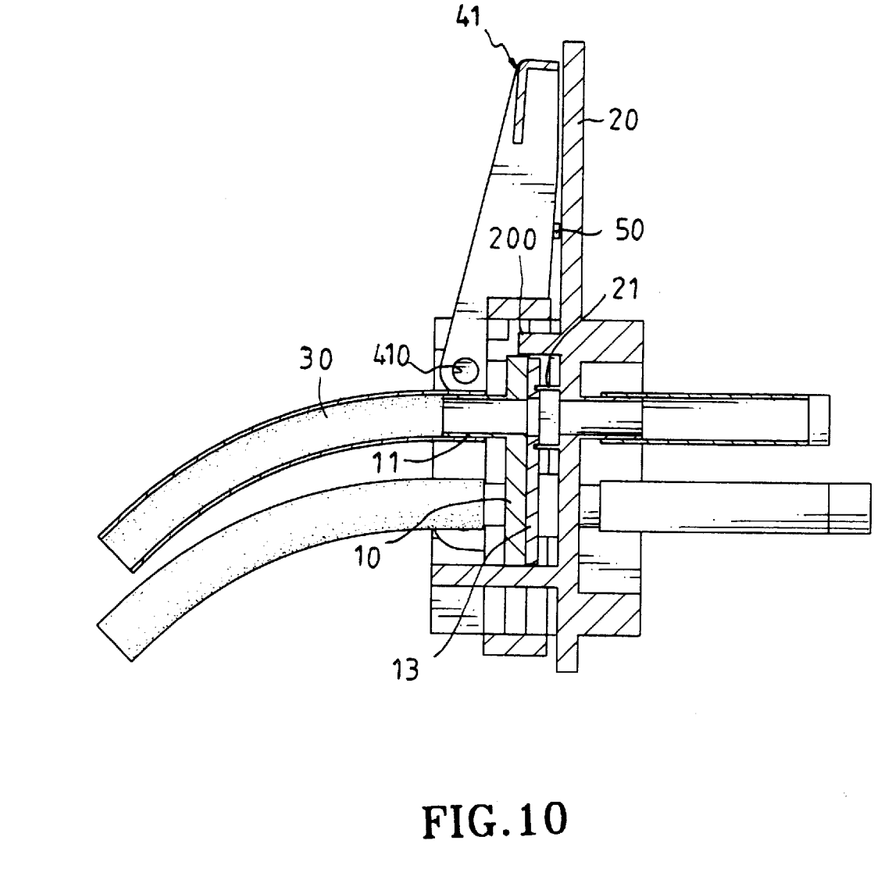
FIG. 10 is a side cross sectional view to show the engagement as illustrated in FIG. 9 wherein the operation frame is to be pivoted to an upright position.

An engaging board 10 has a plurality of second joints 11 and each of the second joints 11 is connected to a hose 30 connected to a compressor or the like. Two protrusions 12 extend from each one of two sides of the engaging board 10 so that the protrusions 12 can be inserted into the notches 431 and then slidably received in the grooves 430 to let the engaging board 10 faces the base board 20 as shown in FIGS. 5–7. A seal pad 13 is connected to the engaging board 10 and the second joints 11 extend through the seal pad 13. The seal pad 13 will be matched with the base board 20 when the first joints 21 engaged with the second joints 11 as shown in FIG. 10.

Figure 11:
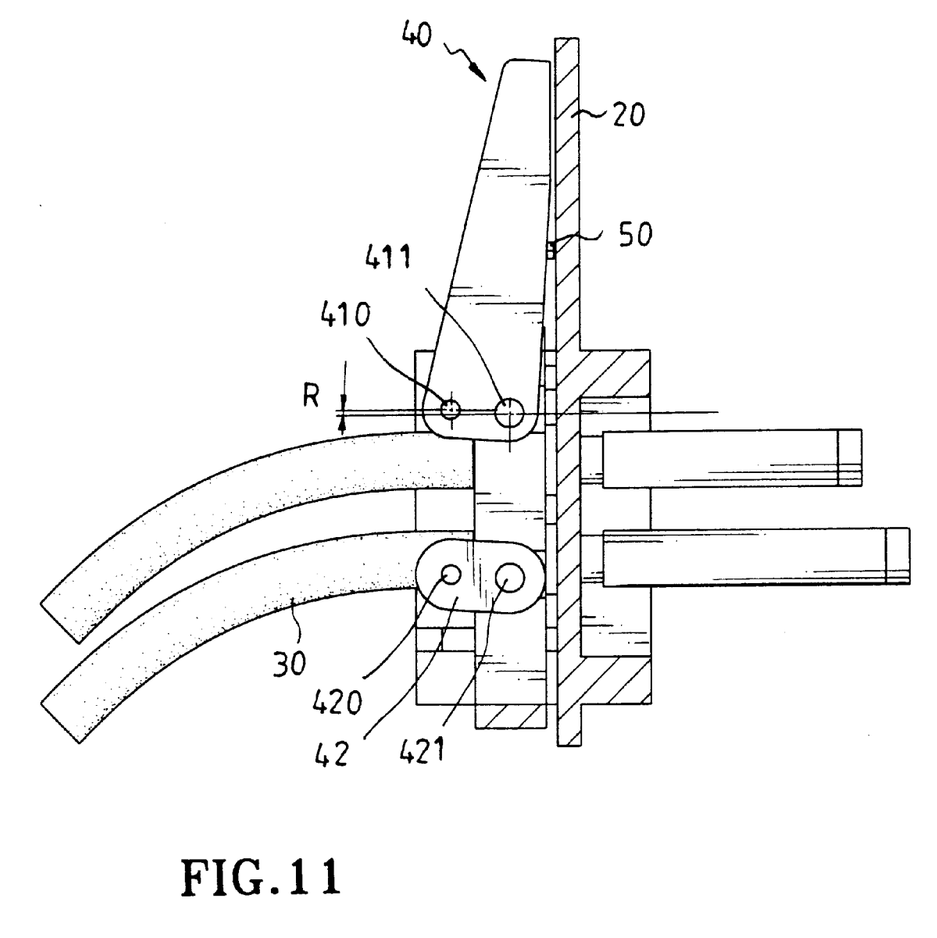
FIG. 11 is a side cross sectional view to show the pivotal points of the operation frame and the link at the situation as illustrated in FIG. 10.

Referring to FIGS. 6, 7, 10 and 11, when the operation frame 41 is pivoted toward the base board 20 about the first bolts 410, the carrier member 40 is moved toward the base board 20, and the second joints 11 are matched with the first joints 21. The two limits 200 prevent the engaging board 10 from being slid upward and the seal pad 13 seals the two contact surfaces of the engaging board 10 and the base board 20. As illustrated in FIG. 11, when the operation frame 41 is pivoted to an upright position, the two pads 50 prevent the operation frame 41 from impacting the base board 20 and the second bolts 411 and the fourth bolts 421 are located slightly lower than the first bolts 410 and the third bolts 420 by a distance "R". This arrangement applies a force to the operation frame 40 toward the base board 20 on one hand, and on the other hand, the operation frame 40 will not pivot reversely.

By the device of the present invention, the engaging board 10 together with the second joints 11 are engaged with the first joints 21 by one action. This saves a lot of time.

While we have shown and described various embodiments in accordance with the present invention, it should be clear to those skilled in the art that further embodiments may be made without departing from the scope and spirit of the present invention.

What is claimed is:

1. A joint engagement device comprising:

a base board having a plurality of first joints defined therein and two sidewalls extending from said base board, a connection board connected between said two sidewalls and two slots defined through said connection board;

a carrier member having a transverse bar and two posts extending from two ends of said transverse bar, said two posts movably extending through said two slots in said connection board, each of said two posts having two notches defined in a surface thereof and each of said two posts having a groove defined longitudinally in an inside thereof, said notches communicating with said groove in each of said posts;

an operation frame having a handle and two arms extending from two ends of said handle, said two arms respectively and pivotally connected to two respective insides of said two sidewalls by two first bolts, said two arms respectively connected to said two posts by two second bolts, and an engaging board having a plurality of second joints and two protrusions extending from each one of two sides of said engaging board, said protrusions being inserted into said notches and slidably received in said grooves, said operation frame being moved toward said base board to engage said second joints with said first joints when pivoting said operation frame toward said base board.

2. The device as claimed in claim 1 further comprising two limits extend from said base board and located above said first joints.

3. The device as claimed in claim 1 further comprising a seal pad connected to said engaging board and said second joints extending through said seal pad, said seal pad matching with said base board when said first joints engaged with said second joints.

4. The device as claimed in claim 1 wherein said first bolts are located lower than said second bolts when said operation frame is not pivoted toward said base board, said first bolts being located higher than said second bolts when said operation frame is pivoted toward said base board.

5. The device as claimed in claim 1 further comprising two links respectively connected between said two posts and said two insides of said two sidewalls, a first end of each of said links pivotally connected to said inside of said sidewall and a second end of each of said links connected to said post.

\* \* \* \* \*